United States Patent [19]

Rochwite

[11] 3,959,804
[45] May 25, 1976

[54] STEREOSCOPIC CAMERA

[76] Inventor: Seton I. Rochwite, 1234 Collins Lane, San Jose, Calif. 95129

[22] Filed: Apr. 21, 1975

[21] Appl. No.: 570,258

[52] U.S. Cl. .............................................. 354/116
[51] Int. Cl.² ........................................ G03B 35/08
[58] Field of Search .................... 354/116, 112, 114

[56] References Cited
UNITED STATES PATENTS

| | | | |
|---|---|---|---|
| 2,385,804 | 10/1945 | Fitz | 354/116 |
| 2,515,272 | 7/1950 | Smith | 354/116 |
| 2,922,349 | 1/1960 | Rochwite | 354/114 |

FOREIGN PATENTS OR APPLICATIONS

| | | | |
|---|---|---|---|
| 699,654 | 11/1953 | United Kingdom | 354/116 |

*Primary Examiner*—Stephen J. Tomsky
*Attorney, Agent, or Firm*—Flehr, Hohbach, Test

[57] ABSTRACT

A stereoscopic camera system is disclosed which includes an insertable film cartridge. An optical system in the camera includes mirrors which are arranged to reflect images from the lenses along coincident axes through aperture plates for exposing sensitized film carried by the cartridge. The cartridge includes a housing forming a supply chamber for containing a roll of the film. Another chamber is provided in the housing for enclosing a take-up spool which is adapted to be driven for advancing the film along a transport track formed about the rim of the housing. A pair of pressure plates are mounted in the housing adjacent the portions of the film which are to be exposed by the light images. Means is provided for yieldably urging the pressure plates against the film so that the latter is maintained in flat relationship against the aperture plates. The transport track includes a concave portion which partially encloses a toothed sprocket which is operable to cock the shutter, regulate the length of film advance and turn the exposure counter. A row of perforations formed along the film engage the sprocket which is thereby rotated each time that the film is advanced.

14 Claims, 3 Drawing Figures

STEREOSCOPIC CAMERA

BACKGROUND OF THE INVENTION

This invention relates in general to stereoscopic cameras and in particular relates to stereoscopic cameras which employ a reflex optical system.

Conventional stereoscopic cameras employ a pair of objective lenses arranged to focus light images onto spaced-apart exposure areas on a sensitized film strip. The film is advanced through the camera from a supply roll onto a take-up spool. However, in such a camera the images developed on the exposures are transposed so that it is necessary to cut apart the positive chips and remount them in proper orientation for use in a viewer or projector. Stereoscopic cameras employing reflex optical systems have been developed to solve the foregoing problem. Such reflex optical systems provide prisims or mirrors which reflect the images from the lenses toward the emulsion sides of a film strip which is positioned along a generally U-shaped path within the camera. The reflex optical system transposes the images into proper orientation on the film strip so that an adjacent pair of the exposures can be utilized in a viewer or projector without the necessity of cutting apart the positive chips.

In existing stereoscopic cameras of the type described, a supply roll of the sensitized film must be individually loaded in the camera and threaded onto the take-up spool. When all exposures are taken, it is then necessary to rewind the film on the supply roll which must be removed before reloading the camera.

In stereoscopic cameras it is important to accurately position the sensitized film with respect to aperture plates through which the light images are passed. The film must be held in accurate position flat against the aperture plates to prevent image distortion, and this is of particular importance where the camera employs small focal length lenses, such as 20 mm lenses.

OBJECTS AND SUMMARY OF INVENTION

It is a general object of the invention to provide a new and improved stereoscopic camera and film cartridge for use with such a camera.

Another object is to provide a stereoscopic camera employing a reflex optical system in which a sensitized film strip is carried within a cartridge which accurately positions portions of the film for exposure to focused light images.

Another object is to provide a film cartridge for a stereoscopic camera in which the cartridge facilitates rapid loading and unloading of film into the camera, in which the requirement for rewinding the exposed film is eliminated, and in which the film is completely protected from extraneous light during loading and unloading and when the cartridge is removed from the camera.

Another object is to provide a stereoscopic camera having a reflex optical system and film cartridge in which the cartridge includes pressure plates which are mounted so as to yieldably urge portions of the film strip into flat relationship against spaced-apart aperture plates whereby image distortion is minimized.

Another object is to provide a stereoscopic camera of the type described in which the film cartridge positions a portion of the filmstrip in driving engagement with a sprocket which cocks the shutter, operates an exposure counter and regulates the film movement when the film is wound on a take-up spool within the cartridge.

The invention in summary includes a stereoscopic camera in which a pair of spaced-apart lenses are associated with reflex optical means to transpose and direct images along coincident axes into a central cavity formed in the camera case. A film cartridge which is insertable into the cavity is formed with a supply chamber for containing a roll of sensitized film strip. The film strip exits from the supply chamber through a light-shielded slot and is trained along a transport track formed about the cartridge rim. The film is threaded through another light-shield slot and into a chamber containin a take-up spool which is operatively engaged by a film advance knob on the camera case. A pair of pressure plates mounted in the cartridge are yieldably urged outwardly so as to press the film strip into flat bridging relationship across a pair of aperture plates. A toothed sprocket is rotatably mounted in the case and is partially enclosed by a concave surface of the cartridge rim so that advancement of the film strip along the rim engages with and rotates the sprocket which in turn cocks the camera's shutter, advances the exposure counter and operates a mechanism which regulates film advance.

The foregoing and additional options and features of the invention will become apparent from the following description in which the preferred embodiments have been set forth in detail in conjunction with accompanying drawings.

DESCRIPTION OF THE PREFERRED EMBODIMENT

Figure 1:
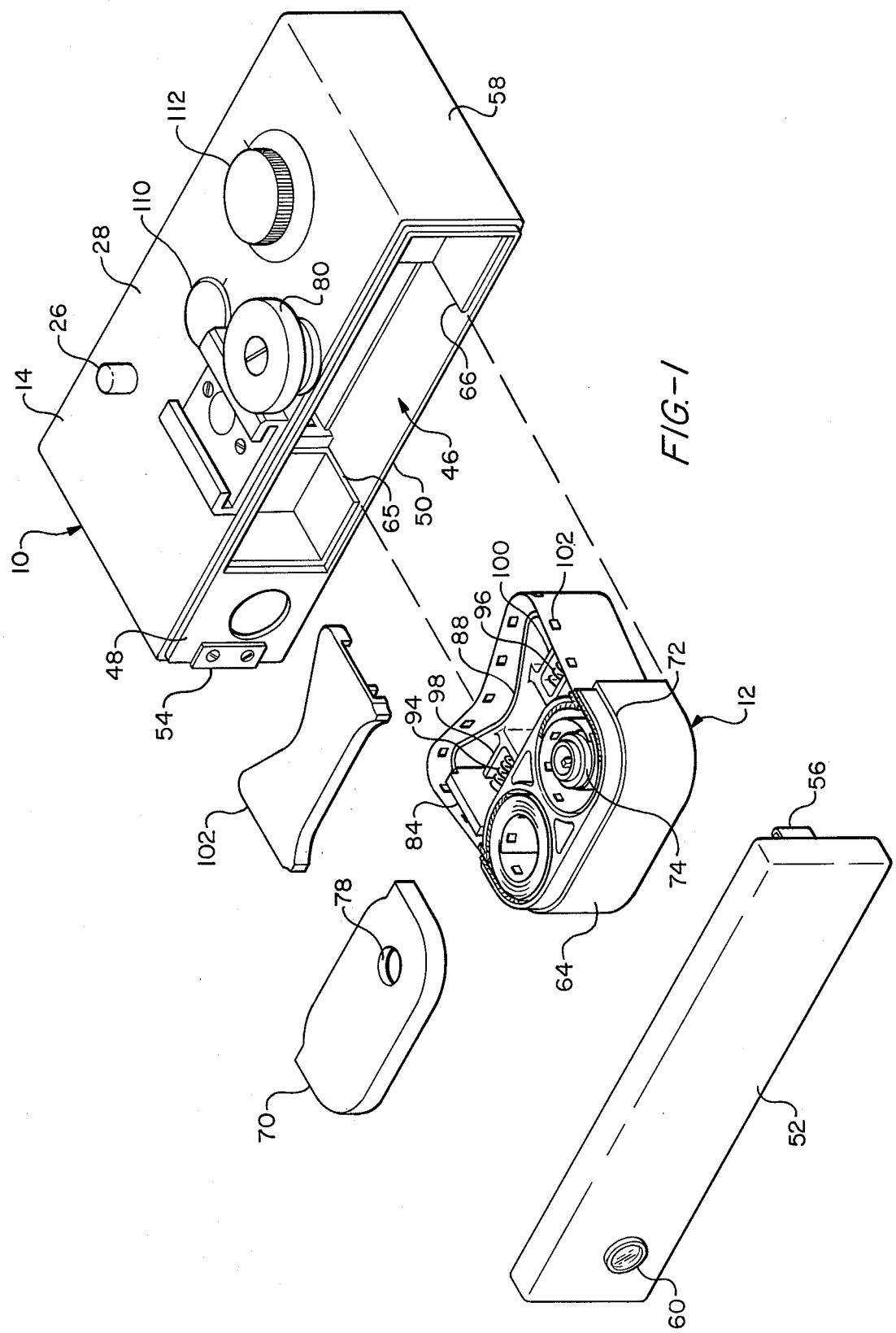
FIG. 1 is a perspective partially exploded view of a stereoscopic camera and film cartridge made in accordance with the present invention.
Figure 2:
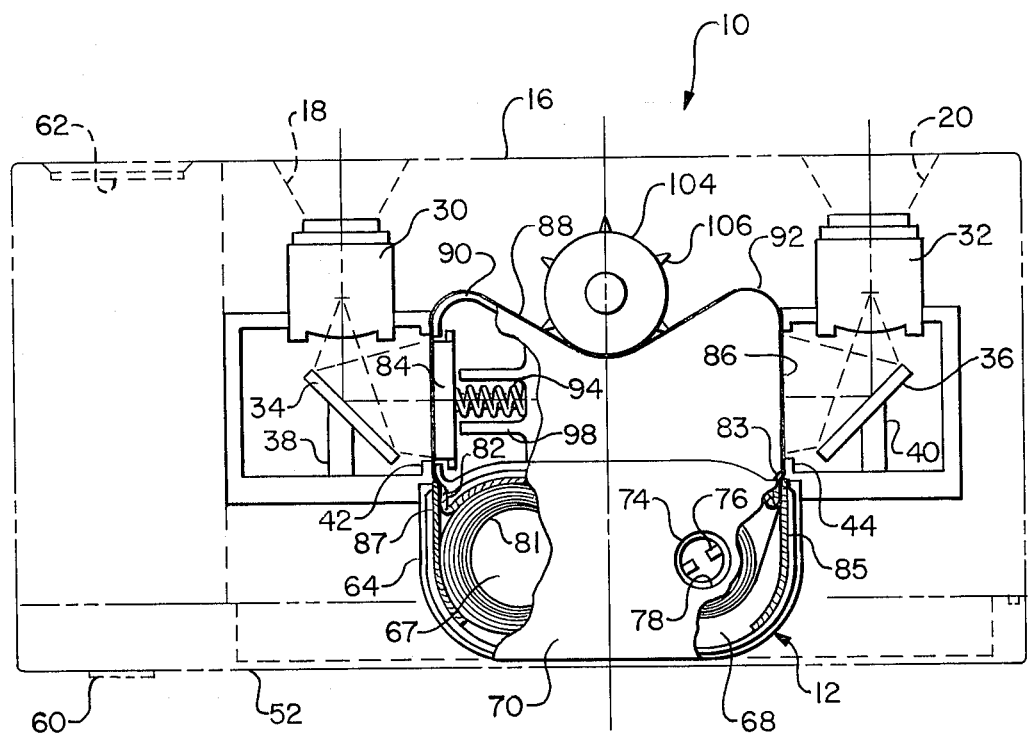
FIG. 2 is a top plan view, partially in phantom, of the camera and film cartridge of FIG. 1.

FIGS. 1 and 2 illustrate a preferred embodiment of the invention comprising a stereoscopic camera 10 and film cartridge 12. Camera 10 comprises a case 14 which includes a front panel 16 formed with spaced-apart openings 18, 20 through which light images from a subject pass into the camera. A pair of shutters, not shown, are mounted within the case inwardly of respective openings and the shutters are operated conjointly by a conventional operating mechanism which is controlled by a shutter release plunger 26. The plunger 26 projects upwardly through an opening formed in top panel 28 of the case. Light images which pass through the shutters are focused by means of a pair of matched objective lenses mounted in respective lens tubes 30, 32.

Reflex optical means is provided for reflecting the focused images from the lenses toward the center of the camera along coincident axes at 90° angles to the lens axes. The optical means includes a pair of mirrors 34, 36 mounted within the camera by suitable mirror mounts 38, 40. The mirrors are set in vertical planes which are oriented at 45° angles with the respective axes of the lenses. The light images are transposed and inverted as they pass through the lenses, and these images are reversly transposed when reflected by the mirrors. The transposed images are directed inwardly of the camera through rectangular apertures formed in a pair of spaced-apart aperture plates 42, 44 which are disposed in planes orthogonal to the coincident axes of the reflected images.

A cavity 46 is formed through a back panel 48 of the camera case for receiving cartridge 12. The cavity extends inwardly of the case and is bounded laterally by the aperture plates and above and below by the top and bottom panels 28 and 50 of the case. The cavity is enclosed rearwardly of the camera by a rear cover 52. The rear cover is releasably mounted on the camera by a lock plate 54 affixed to one end of back panel 48 and by a leaf spring latch 56 affixed to an end of the rear cover for engagement with side panel 58 of the case. A view finder lens system is provided and includes an ocular lens 60 mounted in one side of the rear cover together with an objective lens 62 mounted in an opening provided in front panel 16.

Cartridge 12 includes a housing 64 formed of a suitable synthetic plastic such as ABS or polystyrene. The opposite side walls of the cartridge are sized for a sung sliding fit between shoulders 65, 66 which are formed within the camera cavity 46. The rear end of the housing is molded to define a cylindrical film supply chamber 67 as well as a cylindrical take-up chamber 68. The two chambers are enclosed by a synthetic plastic cover 70 which is secured by means such as ultrasonic or solvent bonding onto a shoulder 72 formed about the upper end of the housing. A take-up spool 74 is mounted for rotation within chamber 68 and the upper end of this spool is formed with a drive socket 76 which is positioned in register with a circular opening 78 formed in cover 70. A spool winding knob 80 is mounted for rotary and axial sliding movement on top panel 28. The winding knob includes a shaft, not shown, which extends downwardly through the top panel and has its lower end formed for releasable engagement with drive socket 76 of the take-up spool. Knob 80 is adapted to be axially pulled out a short distance for disengagement from the socket to permit insertion and removal of the cartridge into and from the camera. With the knob pushed in and engaged, clockwise rotation of the knob turns the take-up spool for advancing the film.

Cartridge 12 is adapted to be loaded with unexposed film by a film manufacturer so that the film remains in the cartridge and cannot be unintentionally removed until ready for developing. With cartridge cover 70 removed, supply chamber 67 receives the unexposed roll of sensitized film strip 81. The free end of the film is threaded onto take-up spool 74 and cover 70 is then bonded to the cartridge housing. A light-tight slot 82 is formed through the wall of the supply chamber for guiding an end of the film strip upwardly toward and along a film transport track which extends about the outer rim of the housing. A second light-tight slot 83 is formed through the wall of take-up chamber 68 for guiding the film to the take-up spool. Both slots are light shielded by means of velvet layers 87, 85 which are bonded to opposite sides of each of the two slots. The velvet layers also extend along the inner walls of the two chambers for protecting the emulsion surfaces of the film.

The film transport track includes a pair of spaced-apart rectangular pressure plates 84, 86 as well as an upwardly concave surface 88 which is joined at its opposite ends by rounded corners 90, 92 which form a smooth continuation of the pressure plates.

When the cartridge is inserted in the camera, the outer surfaces of the pressure plates 84 and 86 are disposed in planes oriented orthogonal to the coincident axes of the reflected light images. The plates are mounted within rectangular openings formed in the cartridge housing for sliding movement toward and away from respective aperture plates 42 and 44. A pair of springs 94, 96 are mounted within seats 98, 100 formed in the cartridge housing, and the springs are connected with the pressure plates for yieldably urging the latter toward the respective aperture plates. During insertion of the cartridge, the two aperture plates in the camera act to cam inwardly the adjacent portions of the film strip and the underlying pressure plates. The spring reaction forces of the pressure plates serve to urge the film into flat bridging relationship across the apertures. The film is thereby accurately positioned across the apertures so that image distortion on the exposures is minimized. This feature is of particular importance where the objective lenses are of a relatively small focal length, such as 20 mm. A front cover 102 is mounted above the springs and pressure plates for holding the latter in their seats, and this cover is secured in place by suitable means such as ultrasonic bonding or cementing.

Figure 3:
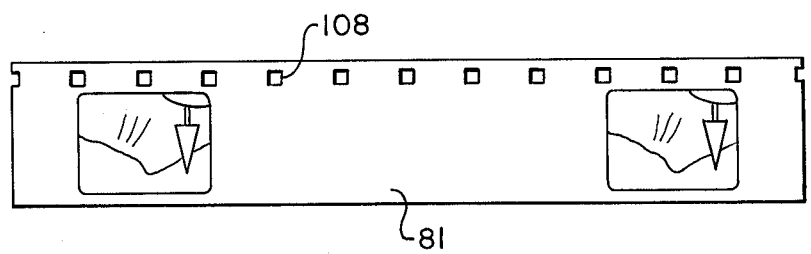
FIG. 3 is a plan view of a portion of a film strip used with the camera and cartridge of the invention.

A sprocket 104 is rotatably mounted in case 14 at a position where the lower surface of the sprocket is partially enclosed by the concave surface 88 of the cartridge housing. A plurality of teeth 106 are mounted at circumferentially spaced positions about the upper end of the sprocket for driving engagement with a row of perforations 108 formed along the top margin of film strip 81, as illustrated in FIG. 3. In the illustrated embodiment film strip 81 is shown as 16 mm size having a single row of perforations. It is understood that the invention encompasses the use of 35 mm film having double row perforations. In such case the camera and cartridge would be suitably adapted to accept the 35 mm film format.

Clockwise rotation of take-up spool 76 tensions the portion of the film strip which runs between sprocket 104 and concave surface 88 so as to create positive driving engagement between the perforations and the sprocket teeth. Advancement of the film strip from left to right as viewed in FIG. 2 drives the sprocket counterclockwise for operating component mechanisms of the camera. The sprocket is connected through a suitable drive train, not shown, for cocking the shutter operating mechanism which operates the shutters. Another drive train connected with sprocket 104 operates a suitable film advance regulating mechanism, not shown, which regulates the proper length of film advance after each exposure is taken by the camera. When the proper length of film has been advanced, the regulating mechanism automatically stops the winding knob so that the next exposure can be taken. Operation of shutter release plunger 26 simultaneously unlocks the film advance regulating mechanism. Another drive train, not shown, is connected with sprocket 104 for turning an exposure counter indicator 110 which is rotatably mounted on top panel 28 for indicating the number of exposures which have been taken by the camera. An *f*-stop setting knob 112 is also mounted on the top panel, and this knob is connected through a suitable drive train, not shown, for controlling the lens aperture settings.

The use and operation of the invention is as follows. Cartridge 12 is first loaded with a roll of film so that the row of perforations 108 are on top toward the open end of housing 64, as shown in FIG. 3. The film roll is loaded so that the emulsion side faces outwardly. Cover 70 is then bonded to the housing in the manner previously described.

For loading the camera, rear cover 52 is removed and spool winding knob 80 is pulled out a short distance so that its shaft will clear cavity 46 and permit entry of the cartridge. The cartridge is then inserted into the cavity with the film perforations on top so as to register with the teeth of sprocket 104. The cartridge is pushed forward until concave surface 88 seats against the sprocket and wraps the underlying film partially around the sprocket surface. As the cartridge is pushed forward, the surfaces of the two aperture plates 42 and 44 cam against the side portions of the film strip and the underlying pressure plates 84 and 86. The pressure plates yieldably move inwardly short distances against the bias forces of the springs. The resulting outwardly directed reaction forces hold the side portions of the film strip in flat bridging relationship across the apertures. Rear cover 52 is then installed against back panel 48 for locking the cartridge within the camera.

Winding knob 80 is pushed down until its shaft engages the drive socket in take-up spool 74. The knob is then rotated clockwise for advancing the film strip clockwise along the film transport track. At the same time, movement of the film turns sprocket 104 counter-clockwise for operating the various drive trains which cock the shutters, turn exposure counter indicator 110, and regulate the amount of film advance. The film is advanced until sufficient unexposed sensitized film has been withdrawn from supply chamber 67 for registering with both of the aperture plates. A stereoscopic picture is then taken by depressing shutter release plunger 26 for exposing the film to the light images focused through the optical system. A single picture exposes the film with a pair of images which are oriented upside-down and spaced apart along film strip 81 in the manner depicted in FIG. 3. For taking succeeding pictures knob 80 is again turned clockwise to wind up the length of the film strip containing both exposures until film advance is stopped by the regulating mechanism which is driven by sprocket 104. This action also cocks the shutter mechanism again for taking an additional pair of exposures on the film which has been withdrawn from the supply chamber. When all exposures have been taken on the available film supply, the winding knob is turned clockwise until the tail portion of the film has been reeled onto the take-up spool within chamber 68. Rear cover 52 is then removed permitting the cartridge to be pulled out of the camera. When out of the camera, the exposed film strip within the take-up chamber is protected from extraneous light by the velvet light shield along slot 83. The cartridge is then delivered to a film processer where the cover 70 is broken apart from the housing and the roll of exposed film removed for developing.

From the foregoing, it is apparent that there has been provided a new and improved stereoscopic camera and film cartridge. The camera and cartridge automatically correct for optical transposing of the image on a film strip, thereby eliminating the requirement for cutting apart the film and physically transposing the images for use in a viewer or projector. The invention facilitates loading the camera with film in that the cartridge can be easily inserted without the requirement of threading film into the camera and without the necessity of rewinding after the last exposure has been made. The invention makes possible the use of a smaller film format than present 35 mm film, while still obtaining satisfactory results. In consequence a relatively small, compact light weight and fully portable stereoscopic camera is provided as compared with presently available 35 mm stereoscopic cameras.

While the foregoing embodiment is at present considered to be preferred, it is understood that numerous variations and modifications may be made therein by those skilled in the art, and it is intended to cover in the appended claims all such variations and modifications as fall within the true spirit and scope of invention.

What is claimed is:

1. In a stereoscopic camera having a pair of spaced-apart lenses mounted in a case with optical means for transposing light images from the lenses and directing the transposed images toward each other along coincident axes, including means forming a cavity within the case, a film cartridge formed with external dimensions for insertion into and removal from the cavity, said film cartridge including a housing forming a chamber for containing a supply of sensitized film strip, means forming a film strip transport track for guiding said film strip from the supply chamber and along a path externally of the housing whereby a first portion of the film strip is disposed orthogonal across the axis of the transposed light image from one of said lenses and another portion of the film strip is disposed orthogonally across the axis of the transposed light path from the other of said lenses, and means for advancing said film strip along the transport track for stereoscopically exposing a series of spaced portions of the film strip to the light images.

2. A stereoscopic camera as in claim 1 which includes shutter means for regulating the transmission of light through said lenses, further including sprocket means rotatably mounted within the cavity for cocking said shutter means, said sprocket means being formed with peripheral teeth in register with a portion of the film strip which is external of said housing, said film strip being formed with one or more rows of perforations which drivingly engage the teeth of said sprocket whereby advancement of the film strip along its path rotates said sprocket for cocking the shutter means.

3. A stereoscopic camera as in claim 2 in which said means forming the film strip transport track includes a portion of the outer rim of said cartridge housing, said outer rim including a pair of film support members which extend in respective spaced-apart planes orthogonal to the coincident axes of the transposed light images for supporting respective portions of the film strip, said transport track further including means forming a concave surface on the outer rim extending between said support members, said sprocket means being closely juxtaposed with the concave surface when the cartridge is inserted into the cavity whereby a film strip which is advanced along the concave surface is tensioned against said sprocket means for positive engagement therewith.

4. A stereoscopic camera as in claim 1, including means forming a pair of spaced-apart apertures in the case for transmitting the transposed light images along the coincident axes into said cavity, said film cartridge when inserted in said cavity positioning said first portion of the film strip to bridge across one of said apertures and simultaneously positioning said second portion of the film strip to bridge across the other of said apertures, and means on the cartridge for urging said first and second portions of the film strip into positive flat relationship across respective apertures.

5. A stereoscopic camera as in claim 4 in which said last mentioned means includes first and second pressure plates mounted on the housing of said cartridge for movement toward and away from respective apertures, together with means for yieldably urging said first and second pressure plates toward respective apertures whereby said first and second portions of the film strip are urged into said flat relationship across respective apertures.

6. A stereoscopic camera comprising the combination of a camera case defining an internal cavity, a pair of lenses mounted in the case at spaced-apart positions for focusing stereoscopic light images into the camera, means for reflecting the light images from the lenses along coincident axes into said cavity, said case including a removable cover for opening and closing said cavity, a film cartridge adapted for insertion into and removal from said cavity, said cover when mounted on the case serving to lock the cartridge in the cavity, first and second spaced-apart aperture plates mounted in the case in planes orthogonal with said coincident axes of the reflected light images and with each plate being formed with an aperture which passes the light images into the cavity, means for enclosing a supply roll of sensitized film strip within the cartridge, means forming a film track for guiding the film strip from the supply roll along a path wherein first and second portions of the film strip bridge across the apertures of respective aperture plates, a take-up spool rotatably mounted within the cartridge for connection with the end of the film strip which leads from the film track means, and operating means for rotating said take-up spool and advancing the film strip along its path.

7. A stereoscopic camera as in claim 6 which includes first and second pressure plates mounted in the cartridge for movement toward and away from respective first and second aperture plates when the cartridge is inserted into the cavity, and means mounted within the cartridge for yieldably urging the pressure plates in directions towards the respective aperture plates whereby the first and second portions of the film strips are urged into flat relationship across the apertures.

8. A stereoscopic camera as in claim 7 which includes sprocket means rotatably mounted within the case for operating a shutter mechanism of the camera, said sprocket means being positioned in driving engagement with a portion of the filmstrip which is positioned between said first and second portions when the cartridge is inserted into the cavity whereby movement of the film strip along its path rotates such sprocket means for operating the shutter mechanism.

9. A stereoscopic camera as in claim 6 in which said operating means includes means forming a driven socket in the take-up spool, and a drive wheel rotatably mounted in the case in register with the take-up spool, said drive wheel having a shaft formed to releasably couple with said driven socket.

10. A film cartridge for use with a stereoscopic camera having an optical system which directs light images from a pair of spaced-apart lenses along coincident axes into opposite sides of a cavity formed within the camera, including the combination of a cartridge housing sized for insertion into and removal from the camera cavity, said housing defining a supply chamber for holding a supply roll of sensitized film strip, a take-up spool rotatably mounted within the housing for engaging with and rolling up an end of the film strip, first and second spaced-apart film support plates mounted in the housing with the plates extending generally in planes which are orthoginal to the coincident axes of the light images when the cartridge is inserted in the camera, track means formed on a portion of the outer periphery of the housing for guiding the film strip serially from the supply chamber across the first and second support plates and onto the take-up spool whereby the portions of the film strip which are disposed against the support plates can be exposed by said light images.

11. A film cartridge as in claim 10 in which the camera is provided with first and second aperture plates which are mounted in close spaced-apart relationship from respective first and second support plates when the cartridge is inserted into the cavity, the cartridge further including means for mounting said support plates for movement toward and away from respective aperture plates, and means for yieldably urging said support plates toward respective aperture plates whereby the portions of the film strip positioned between the support and aperture plates are urged into flat relationship across the aperture plates.

12. A film cartridge as in claim 10 in which the camera includes rotatable sprocket means for operating a shutter mechanism, and said track means includes means forming a concave surface on the outer periphery of the housing which extends between the support plates whereby the sprocket means is at least partially enclosed by the concave surface when the cartridge is inserted into the camera cavity, said film strip curving in a path between said concave surface and the sprocket means to thereby tension against and drivingly engage with the sprocket means.

13. A film cartridge as in claim 10 which includes slot means in the supply chamber for guiding the film strip from the supply roll to the track means, and means for shielding light from entry through the slot means into the supply chamber.

14. A film cartridge as in claim 10 in which the housing defines a second chamber enclosing the take-up spool for holding a roll of film strip which has been exposed, slot means in the second chamber for guiding the film strip from the track means to the take-up roll, and means for shielding light from entry through the slot means into the second chamber.

* * * * *